(12) United States Patent
Van Berlo

(10) Patent No.: US 10,052,996 B2
(45) Date of Patent: Aug. 21, 2018

(54) LASHING AID DEVICE AND METHOD FOR LASHING FRAMED CONTAINERS

(71) Applicant: Cordstrap B.V., Oostrum (NL)

(72) Inventor: Petrus Henri Van Berlo, Deurne (NL)

(73) Assignee: CORDSTRAP B.V., Oostrum (NL)

( * ) Notice: Subject to any disclaimer, the term of this patent is extended or adjusted under 35 U.S.C. 154(b) by 0 days.

(21) Appl. No.: 15/306,723

(22) PCT Filed: Apr. 30, 2015

(86) PCT No.: PCT/EP2015/059586
§ 371 (c)(1),
(2) Date: Oct. 25, 2016

(87) PCT Pub. No.: WO2015/166079
PCT Pub. Date: Nov. 5, 2015

(65) Prior Publication Data
US 2017/0050552 A1    Feb. 23, 2017

(30) Foreign Application Priority Data

Apr. 30, 2014    (NL) ...................................... 2012725

(51) Int. Cl.
*B60P 7/08*      (2006.01)
*B65D 71/04*     (2006.01)

(52) U.S. Cl.
CPC ............ *B60P 7/0869* (2013.01); *B65D 71/04* (2013.01)

(58) Field of Classification Search
CPC ............................... B60P 7/0869; B65D 71/04
USPC ........ 410/39–41, 97, 99, 155; 206/453, 586; 248/354.1
See application file for complete search history.

(56) References Cited

U.S. PATENT DOCUMENTS

| 5,518,348 | A | * | 5/1996 | Tucker ................. | B60P 7/0869 |
| | | | | | 410/41 |
| 5,848,865 | A | | 12/1998 | Beals | |
| 7,407,353 | B2 | * | 8/2008 | George ................. | B60P 7/0869 |
| | | | | | 410/41 |
| 2009/0223025 | A1 | | 9/2009 | Cyrluk | |

FOREIGN PATENT DOCUMENTS

| EP | 1867523 A2 | 12/2007 |
| EP | 1911625 A1 | 4/2008 |
| EP | 1911626 A1 | 4/2008 |
| GB | 2468038 A | 8/2010 |
| NL | 7709052 A | 8/1978 |
| WO | 2011135015 A1 | 11/2011 |

OTHER PUBLICATIONS

International Search Report and Written Opinion dated Jul. 30, 2015 issued in International Patent Application No. PCT/EP2015/059586.

* cited by examiner

*Primary Examiner* — Stephen T Gordon
(74) *Attorney, Agent, or Firm* — Leason Ellis LLP

(57) ABSTRACT

A lashing aid device for attachment to a corner of a frame encompassing a container is disclosed. The lashing aid device includes a frame fixation unit, a securing surface forming a path for a strap, and a pair of first rims formed on opposite sides of the securing surface to align the path therebetween on the securing surface. The pair of first rims includes one or more lips protruding in a direction perpendicular to the path.

19 Claims, 7 Drawing Sheets

LASHING AID DEVICE AND METHOD FOR LASHING FRAMED CONTAINERS

CROSS-REFERENCE TO RELATED APPLICATIONS

This application is a national stage application under 35 U.S.C. § 371 of International Patent Application No. PCT/EP2015/059586, filed Apr. 30, 2015 and published Nov. 5, 2015 as International Publication Number WO 2015/166079, which claims priority and benefit of Netherlands Application No. NL2012725, filed on Apr. 30, 2014, titled "A LASHING AID DEVICE AND METHOD FOR LASHING FRAMED CONTAINERS," the disclosures of which are incorporated herein in their entireties.

TECHNICAL FIELD

The invention pertains to the technical field of securing cargo, more particularly to a device that aids in securing containers which are provided with a frame, such as intermediate bulk containers.

BACKGROUND

Industrial containers are commonly used for transport of liquids and granulate substances (e.g. chemicals, food ingredients, solvents, pharmaceuticals, etc.). Because of the often fragile nature of such containers, often comprising of a rather flexible material, these containers are provided in a framework, e.g. a metal framework. An example of such a container is an intermediate bulk container (IBC). IBCs are stackable containers mounted on a pallet. IBCs can be manufactured out of a number of materials depending upon the needs of the shipper and the legal requirements that must be met. The most common IBC is the one-time use plastic composite IBC; a white/translucent plastic container (typically polyethylene) housed within a tubular galvanized iron cage that's attached to a pallet. In addition to the plastic composite IBC, intermediate bulk containers are also manufactured out of fiberboard, wood, heavy gauge plastic, aluminum, carbon steel, and galvanized iron.

In order to secure the transport of these IBCs in a 20 or 40 ft. container, lashing is required. Several lashing methods for IBCs are known in the art whereby the outer IBCs in a transport container are in direct contact with the straps or bands used for lashing. In many cases, this leads to the damage of the containers, with leakage or material loss as a consequence.

During lashing, an additional device is often used to keep the straps used for lashing at the correct height. Advantageously, the load is divided over two bands instead of one, in order to avoid exuberant pressure on one point of the container.

Several so-called edge protectors are known in the art. EP1911625, WO 2011135015, U.S. Pat. No. 5,848,865 and NL7709052 all describe edge protectors which can be used for protecting fragile containers. However, these devices have some serious drawbacks. The devices known in the art are often not strong or stable enough when the straps during lashing are applied. Moreover, these devices often require additional aids, in order to ensure fixation at a well-defined height.

GB2468038 describes a strap guard for allowing the passage of a strap during the lashing of e.g. a container. The guard according to GB2468038 is not specifically designed for being attached to corner edges of IBCs.

There remains a need in the art for improved methods and devices for lashing containers such as IBCs. The present invention aims to resolve at least some of the problems mentioned above.

The invention thereto aims to provide a device that allows easy positioning on the container, which remains stable and which prevents damage to the container when in lashed situation.

SUMMARY OF THE INVENTION

The present disclosure is directed to a lashing aid device and a methodology for lashing a plurality of containers.

The current invention provides a simple and straightforward solution for applying a considerable load to a framed container during lashing and transport. No additional tools or devices are needed, except for the device as described in the current invention. The device works independent of the design of the container and ensures that the straps remain always at the correct height during lashing and transport, and prevent damages to the lashed container.

DESCRIPTION OF FIGURES

FIG. 3 shows a detailed view of an example of a possible embodiment of the device according to the current invention. FIG. 3a shows a perspective front view of the embodiment, whereas

DETAILED DESCRIPTION OF THE INVENTION

Figure 1:
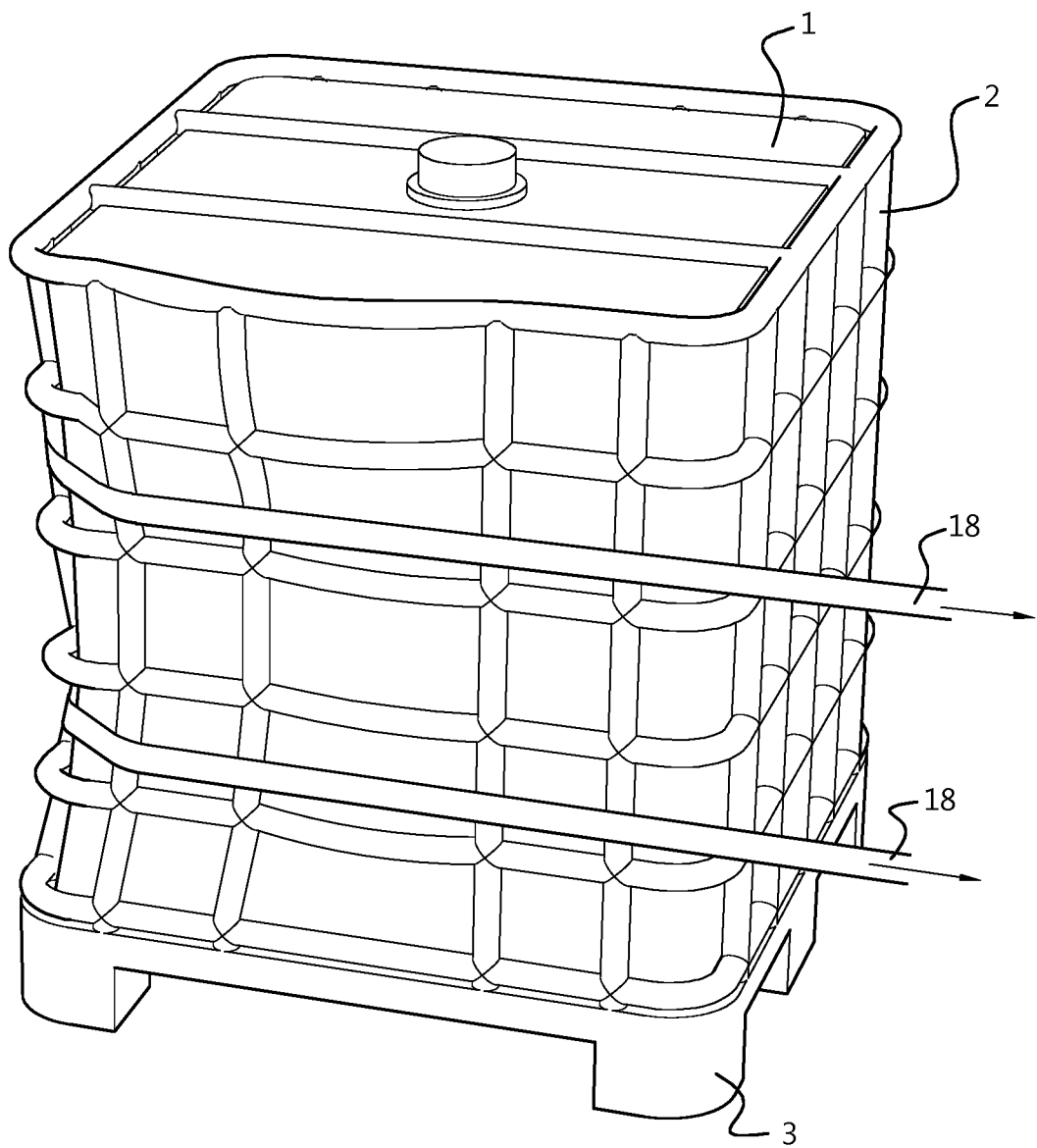
FIG. 1 shows a perspective view of a framed container that can be lashed with a device or a method according to the current invention, as well as one of the problems with the current methods known in the art.

The present invention concerns a lashing aid device suited for aiding with lashing of containers encompassed in a frame, such as intermediate bulk containers. The device is mounted on the frame of aid container, and provides for a simple and adequate tool for lashing one or a plurality of containers such as IBCs.

Unless otherwise defined, all terms used in disclosing the invention, including technical and scientific terms, have the meaning as commonly understood by one of ordinary skill in the art to which this invention belongs.

In a first aspect, the invention provides a lashing aid device for a container, such as an intermediate bulk container. The device is suitable for attachment to a corner of a frame encompassing said container. To that purpose, said device comprises frame fixation means as well as a securing surface which forms a path for a strap. In a preferred embodiment, said path on the securing surface is aligned by rims whereby the latter comprise one or more lips. In a preferred embodiment, said lips are protruding in a direction perpendicular to said path.

The device is attachable to a part of the metal frame by the frame fixation means present on the device. In an embodiment, these frame fixation means provide for a frictional engagement between the device and the framed container. In another embodiment, said frame fixation means provide a clamping action which allow engagement to the container. By preference, said device will be mounted on a horizontal bar of said frame. For the purpose of the current invention, the term 'horizontal bar' is to be understood as one of the bars of the frame encompassing the container which runs parallel to the ground floor or the substrate (such as a palette) which holds the container. The horizontal bars are the strongest points of the frame and hence are extremely beneficial for the current purpose.

Due to the nature of these frame fixation means, the latter are releasable engaged to said framed container.

The fixation means ensure profound and continuous fixation of the device to the frame, even when subjected to significant forces when the containers are in lashed position. The device is further adapted to receive a strap. To that purpose the securing surface, which is located at the top side of the device, forms a path aligned by rims. Said path has a width which is similar or slightly bigger than the straps which are conventionally used for lashing framed containers such as IBCs.

In a preferred embodiment, said path will run parallel to the part of the metal frame it is attached to. The latter allows that the forces applied during lashing are absorbed by the frame, thereby preventing the container to be damaged.

In a possible embodiment, the width of the path will be between 30 and 60 mm, more preferably between 35 and 50 mm, more preferably between 35 and 45 mm, in order to adequately receive a strap commonly used for lashing framed containers (e.g. woven polyester straps or composite straps). The path may enlarge or widen at the lateral ends of the device, whereby said width is larger or slightly larger than the width of said strap, in order to facilitate entrance of the strap under an angle.

The one or more lips which are present on the rims aligning the path prevent a strap from slipping from the device during lashing and when the force on the strap is being changed during emergency situations. The rims from which the lips arise should be seen as an elevation aligning the path for the straps. As such, the lips will also be located in a position which is elevated in view of the plane of the path. Hence the lips will be present above the strap during lashing and will serve as a barrier for escaping the device. Because the lips are placed perpendicular to the direction of the strap, this also forms a barrier for preventing the straps to escape the device.

In a more preferred embodiment, said device comprises at least two lips, placed on opposite rims of said device. The latter will maximally ensure that the strap remains in the correct position.

Said lips may in a preferred embodiment have a length of between 5 to 20 mm, more preferably between 5 to 15 mm, even more preferably between 5 and 10 mm.

In a further embodiment, the device has an arcuate or curved shape. More specifically, said concave part of the device will be provided with the securing surface whereas the convex part will eventually face the framed container. Because of the arcuate shape, the device is particularly suited for being attached to the corner profile of a framed container. The latter are slightly bend due to the form of the container, especially the horizontal bars present in these corner profiles. Hence the arcuate form allows a good attachment to these corner profiles and more specifically to the horizontal corner bars, and allows that the device is firmly attached to the frame by frictional engagement or clamping action.

The device may be provided with a channel on the back side of the device (the fixation surface), being the side opposite to the securing surface (the side receiving the strap) that faces the frame and container when in use. Said channel serves to receive the horizontal bar of said frame. As such, the device will readily be positioned and fit on a horizontal (corner) bar of a corner post of said frame. In a preferred embodiment, said channel is present in the longitudinal direction of the device (lengthwise), preferable running from one edge of the device to the other.

By using the framework and the bars of the frame of the container, the device will always be correctly positioned and will hold its position, even when large forces are applied during lashing. In fact, the frame fixation means provide a first initial fixation of the device to the framed container (in unlashed state). Once correctly applied to the frame, the straps are provided in a correct manner. The force exerted by the straps, in combination with the specific design of the device, will ensure that the device and the straps remain in a correct position, without causing any damage to the load. This is a huge advantageous in view of the systems currently known in the art. Moreover, the design of the device is independent of the container, the frame and the various heights of the bars normally seen on these framed containers. This allows polyvalent use of the device. Finally, the device was found to remain stable in position, even when considerable load was applied on the container. The device was found to sustain over 1000 daN, which exceeds the abilities of all devices currently known on the market.

Adequate fixation to the frame of the container occurs by the fixation means, which provide frictional fixation or a clamping action of the device to the framed container.

The fixation means provide firm attachment to the container and frame, preferably by clicking in or clamping between the vertical bar of the framed container. Once attached to the frame, the container itself will also provide support in order to remain the device in place (and prevent tilting). When in filled state (during transport), the plastic of the container is rigid which is able to provide adequate support.

In an embodiment, these fixation means comprise preferably support arms which are present at one side of said device. In a further embodiment, said fixation means may also comprise support shoulders, which are present on the side opposite to the side of said support arms of said device.

Said support arms run preferably parallel, and are located in a plane lower than said plane of the securing surface. This lower position is made possible by connection parts between said securing surface and support arms, which run essentially perpendicular in view of the securing surface and the support arms. Said support arms form a partition, suitable for receiving a bar of said frame. Because of their lower position, the support arms will fit under the bar that runs perpendicular (the vertical corner bar) to the horizontal bar holding said device. The lips will be preferably positioned at the intersection of the horizontal and the vertical bar. Hence, a good attachment to the frame is provided. Simultaneously the container wall may also provide support to the device and keep the device in place.

As mentioned, said fixation means may further comprise at least two parallel shoulders, located on a side of the device opposite to said support arms. In a preferred embodiment, said shoulders are placed perpendicular to said path formed on the securing surface. During use of the device, the shoulders will clasp a bar of said frame. To that purpose, said shoulders form a partition. The shoulders will preferably clamp a vertical bar of said frame, at the intersection of the horizontal bar supporting the device with a second vertical bar.

In an embodiment, said fixation means comprise both support arms and shoulders.

In another, more preferred embodiment, said fixation means comprise projections which are present at the side of the device opposite to the securing surface (the back side of the device, hereafter called the fixation surface) and are suitable for clamping the framed container. These projections align the channel of the device, which allows receiving a bar of the frame.

In a preferred embodiment, said projections are positioned perpendicular to the longitudinal direction of the channel. The projections point toward the inner side of the channel. The channel is aligned by rims.

In a preferred embodiment, said projections are provided at one rim of the channel, e.g. on a first rim or the second rim. A rim can be provided with one or more projections.

In another, more preferred embodiment, said projections are provided at both rims of the channel (first and second rim). In one embodiment, each rim is provided with one projection. In yet another embodiment, one rim (either the upper or lower) can be provided with one projection, whereas the second rim is provided with two or more projections. In another, more preferred embodiment, sad rims are provided with at least two projections (such as 2, 3, 4, 5, 6).

By preference, if each rim is provided with at least one projection, these projections will be positioned in a staggered configuration. In a further more preferred embodiment, said projections are provided at the outer edges of one rim (e.g. the first rim), and in the center of the second rim or one or more positions aligning the center.

The latter configuration was found to provide optimal fixation to the frame, thereby also allowing easy mounting of the device to the frame.

In an embodiment, said rims aligning the channel are continuous. In another embodiment, said one or all rims follow an uneven path, comprising recesses, whereby said recesses lie in the plane of the device.

The device according to the current invention may be comprised of plastics, composite material or metal such as steel. Steel has as advantage that it is less subjected to temperature changes and creep than plastic. Suitable plastics may be polypropylene (PP) (for example filled with reinforcing additives), High-density polyethylene, Polyvinylchloride (PVC), Polyethylene (PE), Polystyrene (PS), Polyisocyanurate (PIR), Polyurethane (PUR), polyamide, aramid, polyethyleneterephtalate. Suitable composite material may be polyamide nanocomposite (PA6 or PA6 15GF). Suitable metal material may be steel, such as carbon steel ST37.

In a second aspect, the current invention equally relates to a method for lashing a plurality of containers, which are comprises in a frame (e.g. intermediate bulk containers). As mentioned above, these containers are particularly fragile when and get very frequently damaged during transport because of the lashing technique used. Moreover, the straps often do not stay in position during transport, which again leads to damage to the load. Current devices used as aid during strapping of framed containers fail to ensure that the strap remains in place or that the load is not damaged during transport. The current method provides a more reliable alternative to the methods currently known in the art.

Therefore, in a preferred embodiment, said method comprises the following steps:
  providing at least one lashing aid device to a corner profile of a container, said lashing device is mounted on a horizontal bar of said corner profile; and
  lashing said containers by providing one or more straps.

The device is attached to the container frame by frictional engagement or by clamping action. Said strap runs along a path provided by the surface of said device.

Due to the fact that the device is mounted on a horizontal bar of a corner profile of the framed container (via the channel), the strap, which runs over the device, will remain in place at all times during lashing and road transport, and will always remain at the desired height. Because the forces applied during lashing will at least partially be transferred to the frame, keeping the device in place, the use of considerable forces during lashing are allowed (much more than generally known in the art).

Preferably, the strap is additionally kept in position by lips present on said device.

In a further preferred embodiment, the device makes use of the intersections between the horizontal bar and two subsequent vertical bars for attaching the device to said frame. The device fits a bar of the frame by means of a channel that is provided at the fixation surface and which allows receiving a bar. Said device further comprises frame fixation means which allow engagement of the device with the framed container. According to an embodiment of the method of the current invention, one part of these fixation means will support a first vertical bar at to distinct points adjacent to said intersection of the vertical bar with the horizontal bar. A second part of said frame fixation means will clamp a second vertical bar, at to distinct points adjacent to said intersection of the horizontal bar with said second vertical bar.

In another embodiment, projections provided at the rim of the channel located at the securing surface enable fixation of the device to the frame.

By preference, at least two lashing devices are provided, mounted on the same corner profile of one container. Said lashing device are parallel towards each other.

When a plurality of containers is being lashed, only the containers which are located at the corners of the constellation are provided with at least one lashing device at their outer corner profiles.

In a preferred embodiment, said device used is a device as described in one of the embodiments above.

In a final aspect, the current invention also relates to a plurality of containers, lashed according to the method as described herein and a kit comprising of a strap and at least one device according to one of the embodiments as described above.

The invention is further described by the following non-limiting examples which further illustrate the invention, and are not intended to, nor should they be interpreted to, limit the scope of the invention.

FIG. 1 shows a conventional framed container (IBC). When lashed without a device according to the current invention, the outer IBCs which are in direct contact with the straps risk to be folded or damaged during transport. Moreover, the straps used will tend to slide from their original position, which may have unwanted and unsafe consequences during transport.

Figure 2:
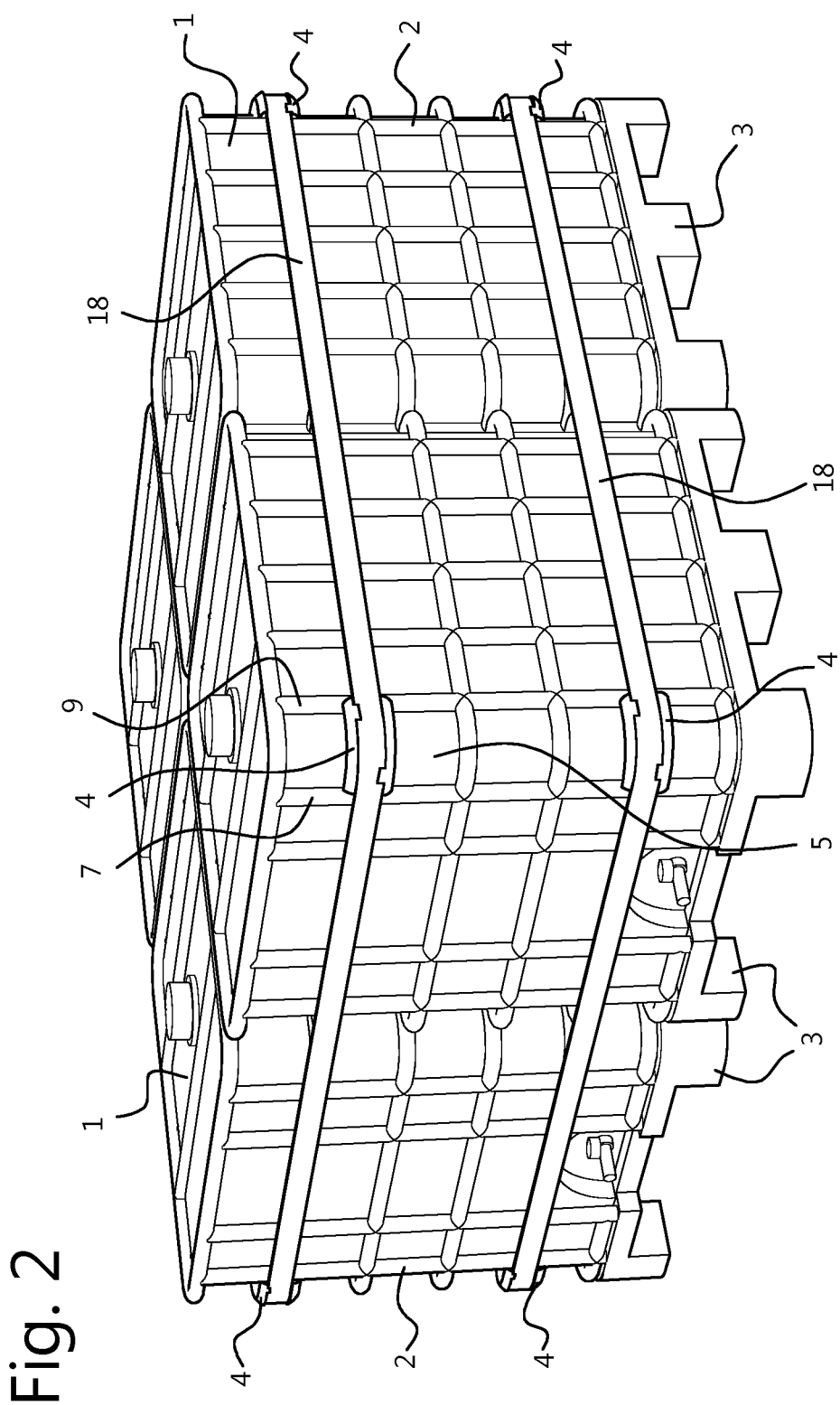
FIG. 2 shows a perspective view of a plurality of containers provided with an embodiment of the device according to the current invention.

FIG. 2 shows a plurality of framed containers (1) provided with an embodiment of the device according to the current invention. The containers are placed in a constellation on a surface such as a pallet (3). The outer containers (1) are provided with an embodiment of the device (4) according to the current invention.

This device is placed at the outer corner profile (5') of the framed container, being the corners which are essentially free and not facing another container. In order to adequately secure the containers (1), two devices (4) are provided at the free corner profiles (5') of said container. These devices are mounted on the horizontal bar of the fame present at the corner profiles (5). Because of the appearance of the corners of the container and consequently also of the frame (2) at that position (more or less 90 degrees profile), the device (1) will have an arcuate shape which corresponds to the corner profile of a container.

Figure 3A:
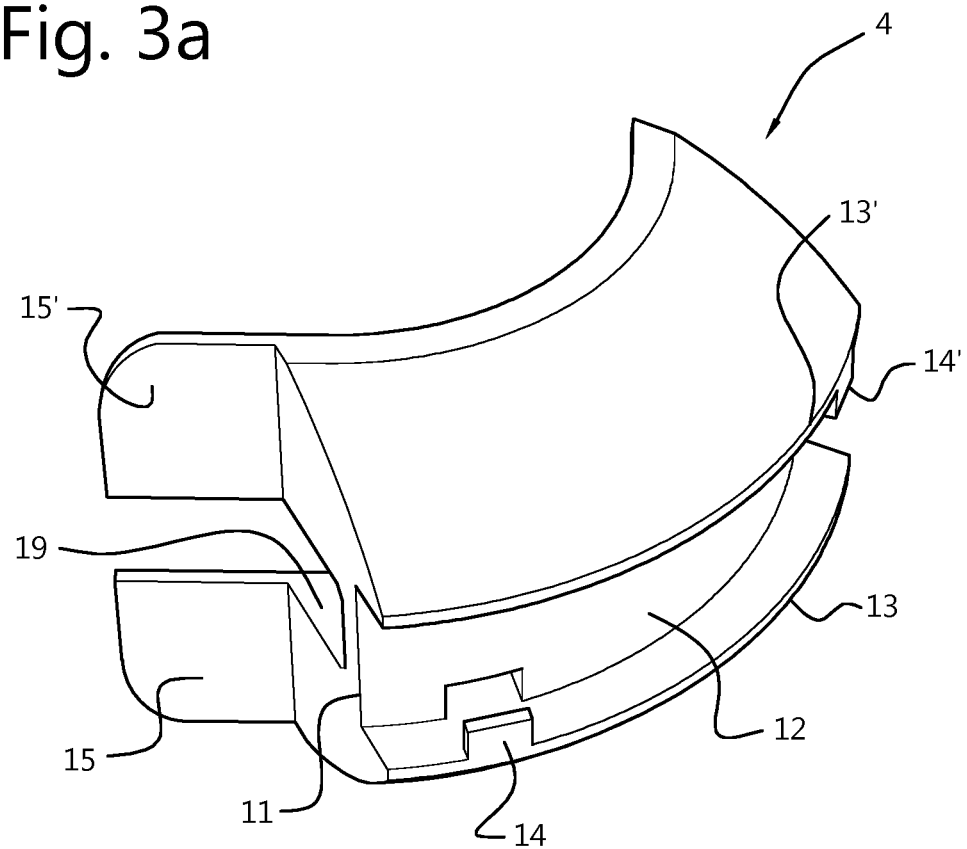
Figure 3B:
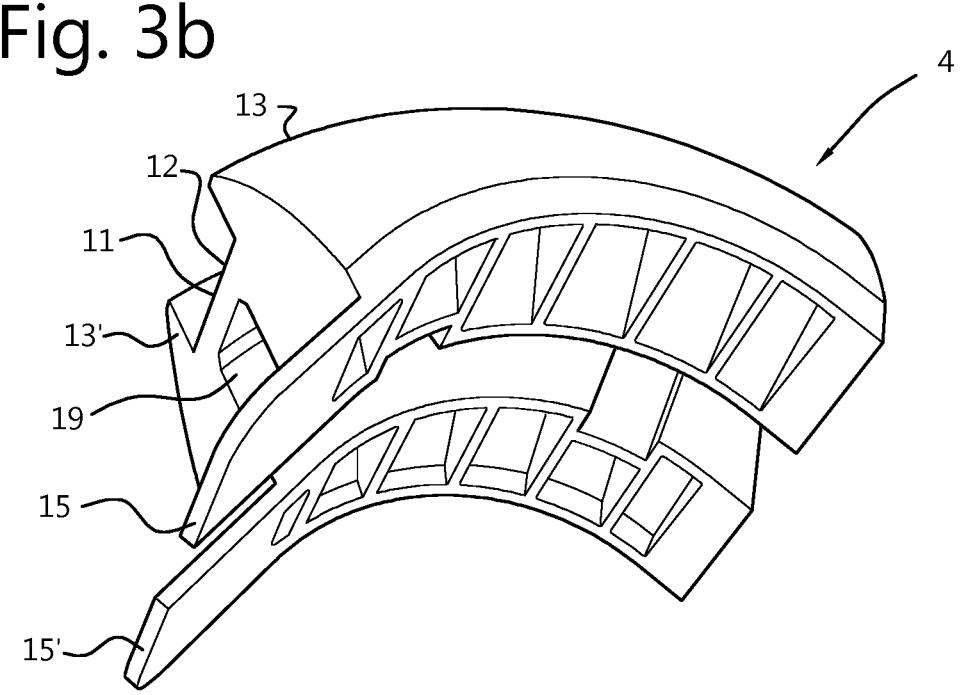
FIG. 3b depicts a perspective rear view.

FIG. 3 shows a detailed perspective view of a possible embodiment of the device (1) according to the current invention. FIG. 3a shows a perspective top view of the device (1), whereas FIG. 3b shows a perspective rear view of the same device (1). The upper surface of the device (1) is provided with a securing surface (11) whereby the securing surface (11) forms a path (12) which is able to receive a strap (18). The path (12) is aligned by rims (13, 13') which are placed in the longitudinal direction of the device (4) and which provide for demarcation of the path (12). The path (12) lies in a lower plane than the rims (13, 13'), which allows the strap (18) to remain in place and on the correct height. Slippage of the strap will be prevented.

Said rims (13, 13') are furthermore provided with lips (14, 14') which are preferentially placed on opposite sides. The rims (13, 13') are preferably placed perpendicular to the direction of the strap (18). As the rims (13, 13') from which the lips (14, 14') arise are an elevation aligning the path for the straps, these lips (14, 14') are equally located in a position which is elevated in view of the plane of the path (12). Hence the lips (14, 14') will be present above the strap during lashing and will serve as a barrier for escaping the device (4).

The back of the device (4) as shown in FIG. 3B comprises a channel (19) in the longitudinal direction of the device, which allows receiving a horizontal bar of the container frame. The dimensions of the channel (19) (depth, width) is thus chosen that the channel can embrace a horizontal bar at a corner profile of the container frame. By preference, said channel (19) has a U-formed shape in cross sectional view. The depth of the channel allows that the device, when in mounted state, is supported by the container at point B and by the horizontal bar at point A (see FIG. 4). The channel is aligned by an upper (21') and lower (21") rim.

Figure 4:
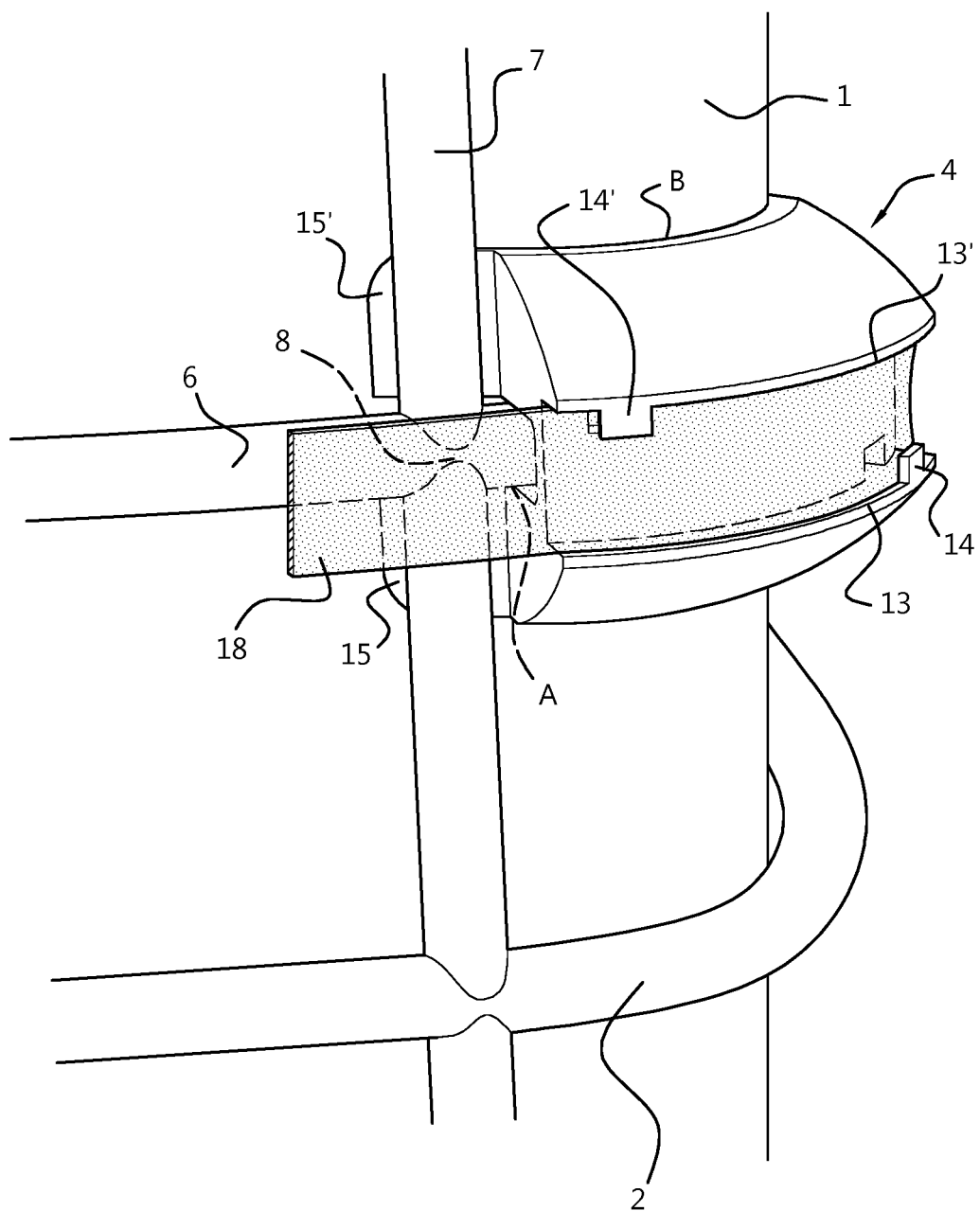
FIG. 4 shows a perspective view the embodiment of FIG. 3, attached to a corner profile of a framed container.

The device (1) further comprises support arms (15, 15') present at an extremity of the device (1). These arms (15, 15') are placed in a plane lower than the plane of the securing surface (11). The arms (15, 15') form a partition which allows passage of a horizontal bar. The thickness of the arms is thus chosen that they can slide underneath a vertical bar at the intersection of a vertical and horizontal bar. The device as shown in FIGS. 3 and 4 is preferably produced from a plastic or composite material. This embodiment, when being in use, will find also support on the container body itself.

Figure 7:
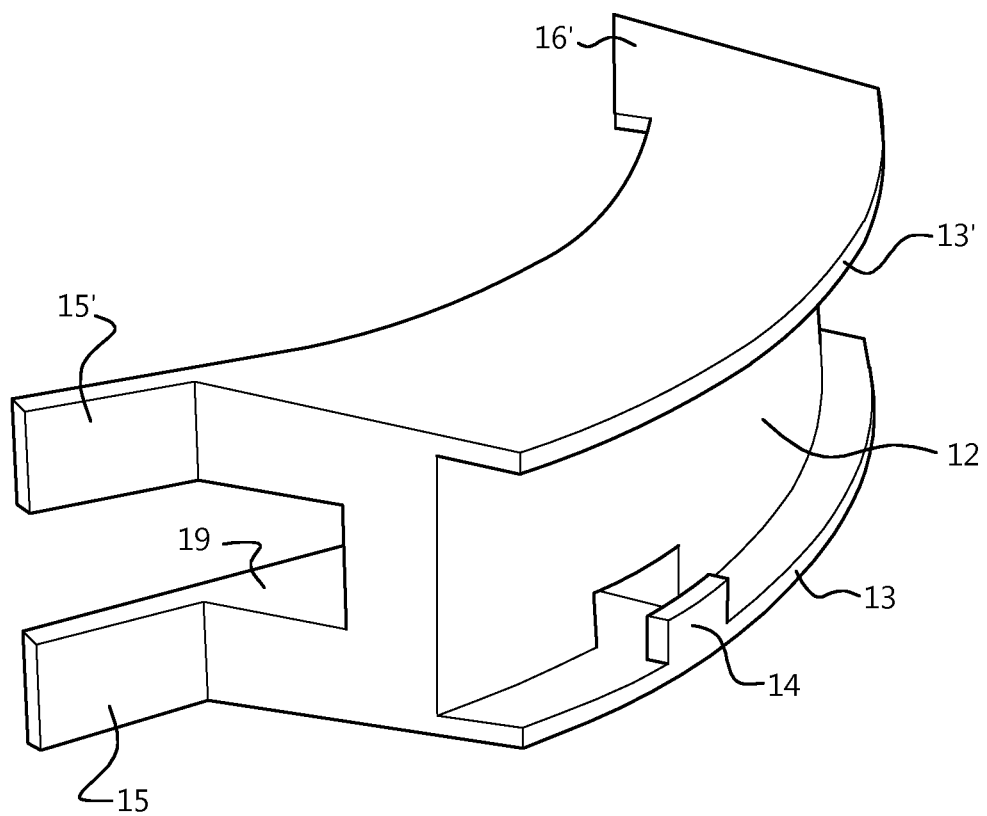
FIG. 7 shows a perspective view of yet another example of a possible embodiment of the device according to the current invention.

In an alternative embodiment of the device, the device (4) is further provided with support shoulders (16) (see FIG. 7). These support shoulders are located on a side of the device (4) opposite to the support arms (15, 15'). The shoulders (16, 16') are placed perpendicular to the path (12) formed on the securing surface (11). The shoulders (15, 15') are thus designed that they can clasp a vertical bar of a frame at the intersection between the horizontal and said vertical bar.

FIG. 4 shows the embodiment of FIG. 3, which is attached to a corner profile of a framed container and which has received a strap. As shown, the strap is hold in place by the path (12), the rims (13, 13') aligning the path and the lips (14, 14') protruding from the rims. The device encompasses the horizontal bar (6) by the channel (19). The support arms will rest underneath a first vertical bar (7), at the intersection of the horizontal bar (6) with said first vertical bar (7). This will allow the device to remain in place when attached to said frame (2). Further support is provided by the container body. The device (4) has an arcuate shape, in order to fit exactly to the corner profile (5).

Figure 5:
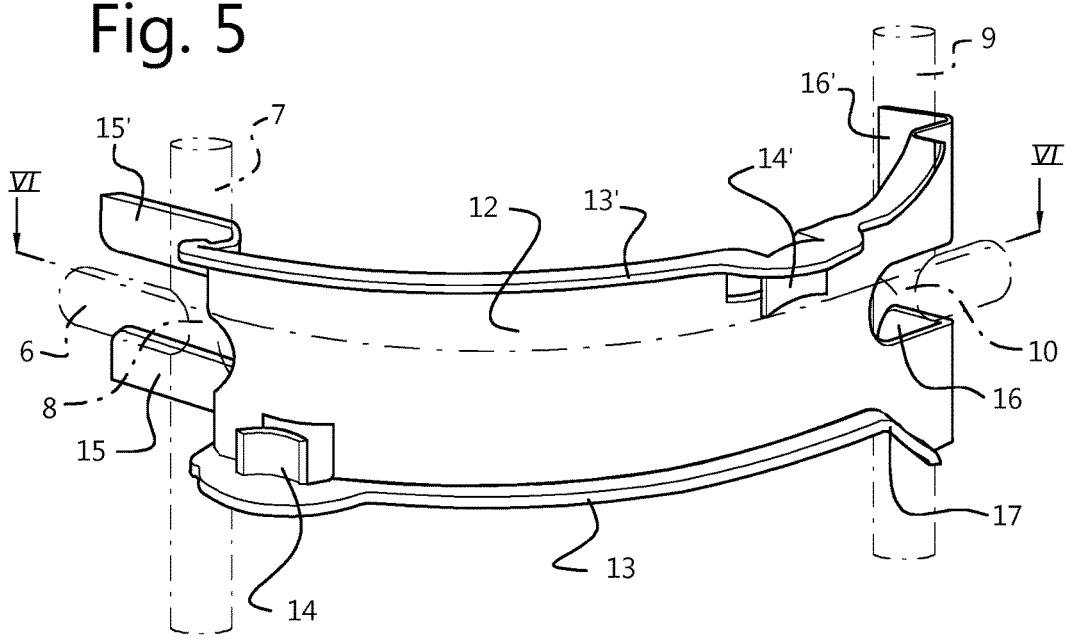
FIG. 5 shows a perspective front view of another possible embodiment of the device according to the current invention, attached to a framed container.

FIG. 5 shows another possible embodiment of the device according to the current invention. This device is preferably produced of steel. The device is light in weight, but still enables to withstand considerable forces. As shown in the previous embodiment, the device comprises a path (12), aligned by rims (13, 13') and lips (14, 14') protruding in a direction perpendicular to the direction of said path (12) and strap. The longitudinal, curved body of the device (4) rests with its back end on a horizontal bar (6). At one end, the device (4) is provided with support arms (15, 15') which form a partition and slide underneath a first vertical bar (7) at the intersection of the horizontal bar (6) and said first vertical bar (7). To that purpose, the arms (15, 15') lie in a lower plane than the one of the path (12). At the other end, said device (4) is provided with a pair of support shoulders (16, 16') which clasp around a second vertical bar (9) at the intersection of the horizontal bar (6) and the second vertical bar (9). As such, the device is fixated between the frame (2) and the container (1). When lashed, the forces are transferred to the container (1) and the frame (2).

The device will preferably widen at the level of the frame fixation means. In order to prevent cutting of the strap, the rims have rounded edges (17) at the level of widening.

Figure 6:
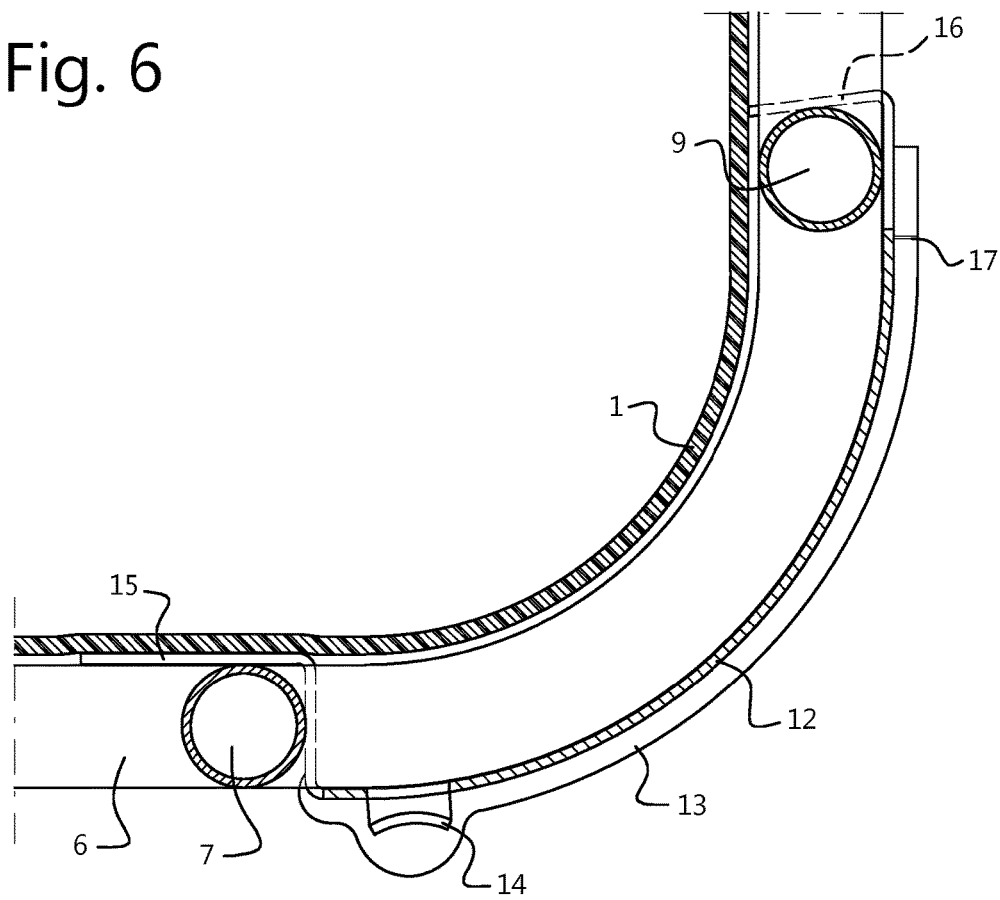
FIG. 6 shows a two-dimensional sectional view of the embodiment shown in FIG. 5, attached to a framed container.

FIG. 6 shows a two-dimensional cross-sectional view of the device (4) attached to corner profile (5) as shown in FIG. 5 (horizontal cross-section through the horizontal bar). From FIG. 6 it is clearly visible that the support arm (15) will be positioned between the vertical bar (7) and the container (1), whereas the shoulder (16) will clasp around a second vertical bar (9). The device will in its longitudinal direction rest on a horizontal bar (not shown). Contrary to the embodiment shown in FIGS. 3 and 4, the device according to this embodiment does not find support on the container body. This configuration allows good attachment of the device (4) even when being submitted to considerable forces.

Figure 8:
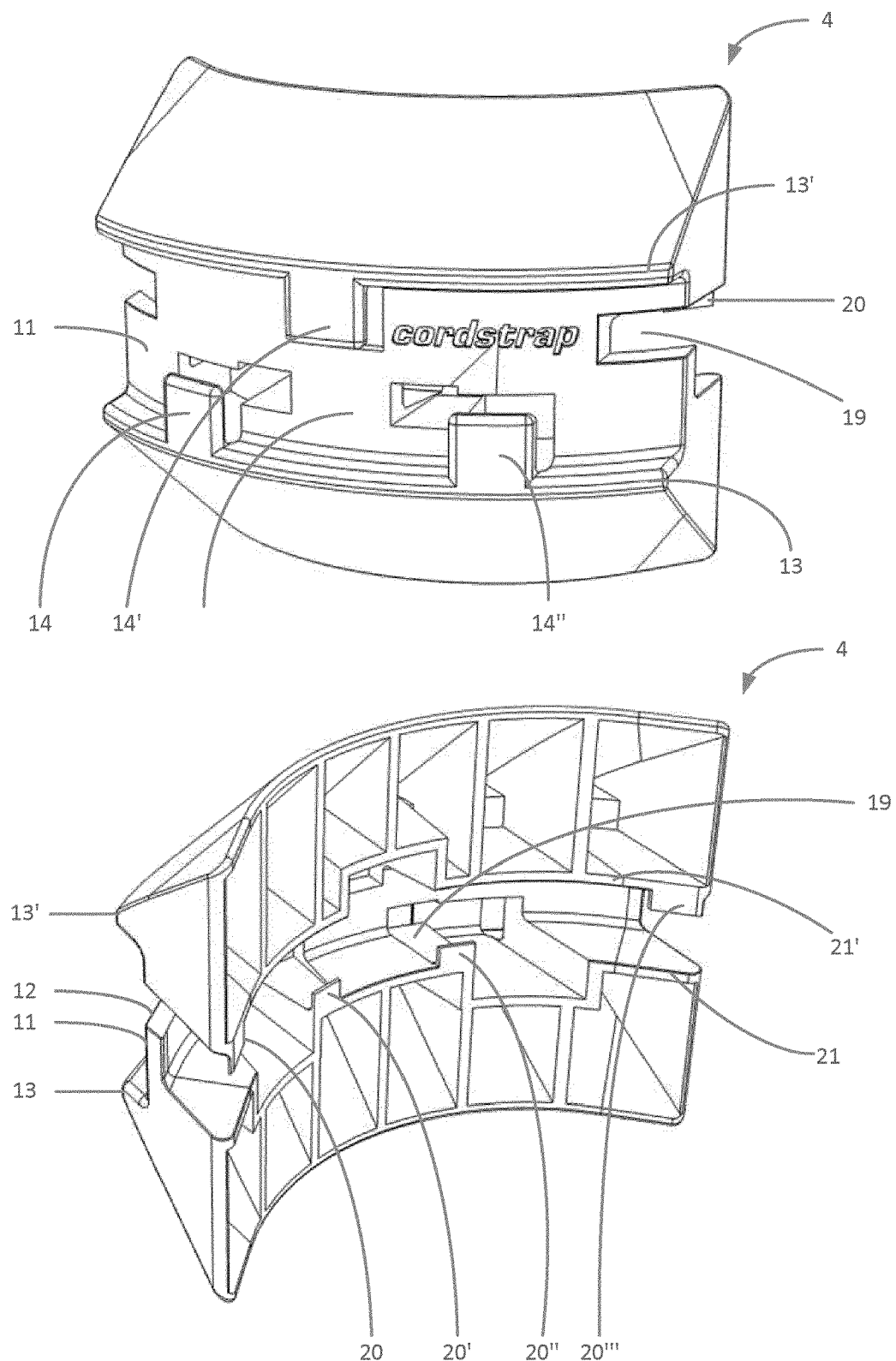
FIG. 8 shows a front and back of a possible embodiment according to the current invention.

FIG. 8 shows yet another embodiment of the current invention. FIG. 8 shows a front and back side of the device (4). The securing surface (11) is provided with a path (12) for receiving a strap (not shown). Lips (14, 14' and 14") are protruding from the rims (13, 13') aligning the path (12) which can hold the strap in place.

The fixation surface (back side) of the device (4) is provided with a channel (19) which allows receiving a bar of a container frame. The channel extends along the length of the device. The channel (19) is aligned by a first (21') and second (21) rim. In the embodiment shown in FIG. 8, the rims follow an uneven path and are provided with recesses. These recesses provide a certain degree of flexibility to the device which makes mounting of the device to the frame easier. It should however be clear to a skilled person In the embodiment shown in FIG. 8, the upper (21') and lower (21) rim of the channel (19), are provided with projections (20, 20', 20", 20"'). Those projections (20, 20', 20", 20''') serve to fixate the device to the frame. The device is placed on a bar of the frame and is clicked onto the bar. The projections (20, 20', 20", 20''') thereby generate a clamping action which allows the device (4) to remain a correct position on the bar. The straps are subsequently placed on the securing surface of the device and around the load. The force exerted by the strap allows the device to remain in place, even when considerable forces are applied to the device.

The projections as shown in FIG. 8 are present on both the first (21') and second (21) rim. The first rim (21') is provided with two projections (20 and 20") which are located at the outer edges of the rim (21'). The second rim (21) is equally provided with two projections (20', 20''') which are located at or around the center of the rim (21). The projections shown in FIG. 8 have a rectangular or square surface but other forms such as elliptical or rounded forms are possible. The projections are placed perpendicular to the direction of the bar on which the device can be clamped and perpendicular to the direction of the channel (19).

The device (4) can be provided by chambers which contribute to the lightness of the device (4).

Although the embodiment of FIG. 8 provides for an optimal functioning of the device, it should be apparent to a skilled person that alternative configurations are equally possible.

FIGURE FEATURES

1: container
2: frame
3: palet
4: device
5: corner profile
5': outer corner profile
6: horizontal (corner) bar
7: first vertical (corner) bar
8: first intersection
9: second vertical (corner) bar
10: second intersection
11: securing surface
12: path
13, 13': rim
14, 14': lip
15, 15': support arm
16, 16': support shoulder
17: rounded edges
18: strap
19: channel
20, 20', 20", 20''': projection
21': first rim of channel
21: second rim of channel

The invention claimed is:

1. A lashing aid device, having a longitudinal direction, that attaches to a corner of a frame encompassing a container, said lashing aid device comprising:
a securing surface forming a path for a strap on a first side of the lashing aid device;
a pair of rims formed along the longitudinal direction on opposite sides of the securing surface to align the path therebetween on the securing surface, wherein said pair of rims comprises one or more lips protruding in a direction perpendicular to said path; and
a channel formed on a second side of the lashing aid device, the second side being an opposite side of the securing surface,
wherein the channel is substantially parallel with the path for the strap, and
wherein the channel receives a bar of the frame.

2. The lashing aid device according to claim 1, wherein said one or more lips comprise at least two lips placed on said pair of rims, respectively.

3. The lashing aid device according to claim 1, wherein said channel runs along a longitudinal direction of said lashing aid device.

4. The lashing aid device according to claim 1, having an arcuate shape.

5. A lashing aid device that attaches to a corner of a frame encompassing a container, said lashing aid device comprising:
a frame fixation unit;
a securing surface forming a path for a strap on a first side of the lashing aid device;
a pair of first rims formed on opposite sides of the securing surface to align the path therebetween on the securing surface, wherein said pair of first rims comprises one or more lips protruding in a direction perpendicular to said path;
a channel formed on a second side of the lashing aid device, the second side being an opposite side of the securing surface;
a pair of second rims aligned on opposite sides of said channel; and
one or more projections provided to at least one of the pair of second rims,
wherein said channel runs along a longitudinal direction of said lashing aid device, and
wherein the channel receives a bar of the frame.

6. The lashing aid device according to claim 5, wherein said one or more projections are protruding in a direction perpendicular to said channel.

7. The lashing aid device according to claim 5, wherein the one or more projections comprise:
a first projection provided to one of the pair of the second rims; and
a second projection provided to the other of the pair of the second rims.

8. A plurality of containers that are lashed together using the lashing aid device according to claim 1.

9. The lashing aid device according to claim 5, wherein said one or more projections protruding perpendicular to a longitudinal direction of the channel.

10. The lashing aid device according to claim 5, wherein the one or more projections comprise first and second projections protruding from the pair of second rims, respectively.

11. The lashing aid device according to claim 2, wherein said at least two lips placed on said pair of rims comprise two lips placed on one of the pair of rims and a lip placed on the other of the pair of rims.

12. The lashing aid device according to claim 1, further comprising:
another pair of rims aligned on opposite sides of said channel.

13. The lashing aid device according to claim 12, further comprising:
one or more projections provided to at least one of said another pair of rims,
wherein said one or more projections protrude in a direction perpendicular to said channel.

14. A lashing aid device, having a longitudinal direction, that attaches to a corner of a frame encompassing a container, said lashing aid device comprising:

a securing surface forming a path along the longitudinal direction for a strap on a first side of the lashing aid device;

a pair of rims placed along the longitudinal direction and formed on opposite sides of the securing surface to align the path therebetween on the securing surface, wherein said pair of rims comprises one or more lips protruding in a direction perpendicular to said path;

a channel formed on a second side of the lashing aid device, the second side being an opposite side of the securing surface; and another pair of rims aligned on opposite sides of said channel, wherein the channel receives a bar of the frame.

15. The lashing aid device according to claim 14, wherein said channel runs along a longitudinal direction of said lashing aid device.

16. The lashing aid device according to claim 14, further comprising:

one or more projections provided to at least one of said another pair of rims.

17. The lashing aid device according to claim 16, wherein said one or more projections protrude in a direction perpendicular to said channel.

18. A plurality of containers that are lashed together using the lashing aid device according to claim 5.

19. A plurality of containers that are lashed together using the lashing aid device according to claim 14.

* * * * *